United States Patent [19]

Schlicht

[11] Patent Number: 4,458,924
[45] Date of Patent: Jul. 10, 1984

[54] BIMETAL FLANGE CONNECTOR

[76] Inventor: Gunter Schlicht, 15 Briones View, Orinda, Calif. 94563

[21] Appl. No.: 425,127
[22] PCT Filed: Nov. 27, 1981
[86] PCT No.: PCT/US81/01596
 § 371 Date: Jul. 29, 1982
 § 102(e) Date: Jul. 29, 1982
[87] PCT Pub. No.: WO82/01927
 PCT Pub. Date: Jun. 10, 1982

Related U.S. Application Data

[63] Continuation-in-part of Ser. No. 212,021, Dec. 1, 1980, abandoned.

[51] Int. Cl.³ ............................................. F16L 23/00
[52] U.S. Cl. ..................................... 285/329; 164/99; 285/412; 285/416
[58] Field of Search ............... 285/173, 329, 422, 416, 285/412, 405, 368, 297, 414; 164/99, 100, 101; 228/263 D

[56] References Cited

U.S. PATENT DOCUMENTS

| | | | |
|---|---|---|---|
| 1,011,430 | 12/1911 | Henry | 164/93 X |
| 1,716,833 | 6/1929 | Rich | 164/99 |
| 2,653,211 | 9/1953 | Andrus | 285/329 |
| 3,065,535 | 11/1962 | Crehan et al. | 228/263 D X |
| 3,284,112 | 11/1966 | Martin | 285/368 X |
| 3,794,363 | 2/1974 | Schulz | 285/368 X |
| 3,863,701 | 2/1975 | Niimi et al. | 164/100 X |
| 3,909,049 | 9/1975 | Blatnica | 285/329 |
| 4,336,958 | 6/1982 | Goetzinger | 285/329 X |

FOREIGN PATENT DOCUMENTS

| | | | |
|---|---|---|---|
| 54-160520 | 12/1979 | Japan | 164/100 |
| 838798 | 6/1960 | United Kingdom | 285/173 |
| 859677 | 1/1961 | United Kingdom | 285/414 |

*Primary Examiner*—Thomas F. Callaghan
*Attorney, Agent, or Firm*—Bielen and Peterson

[57] ABSTRACT

A bimetal flange connector (10) for connecting components (15) of a piping system such as fittings or pipe in which the bimetal flange connector (10) has a hub or preformed inset (12) of a first metal material compatible with the piping system components (15) enabling welding, brazing or other method to be utilized in connecting the inset (12) to the piping system component. The bimetal flange connector (10) has a rim (14) of a second metal material castable directly onto said inset (12). The rim (14) is retained on the inset (12) by a shrink fit on cooling, a metallurgical bond, a preformed retainer configuration of the inset or a combination of the foregoing. For certain combinations, of low carbon inset material and high carbon rim material, the inset (12) is prepared for the cast-on rim (14) by the interposition of a boundary layer (45) of carbon migration inhibiting material to prevent carbon migration from the cast-on rim (14) from adversely affecting the properties of the inset (12). The bimetal flange connector (10) allows the inset (12) to be of one composition with desirable characteristics for connecting to a piping system component (15) and the rim (14) to be of a second material with desirable characteristics for mechanical connection to a mating flange, one preferred embodiment employing a stainless steel inset (12), a ductile iron rim (14) and an interposed chromium boundary layer (45) at the interface juncture of rim and inset.

6 Claims, 9 Drawing Figures

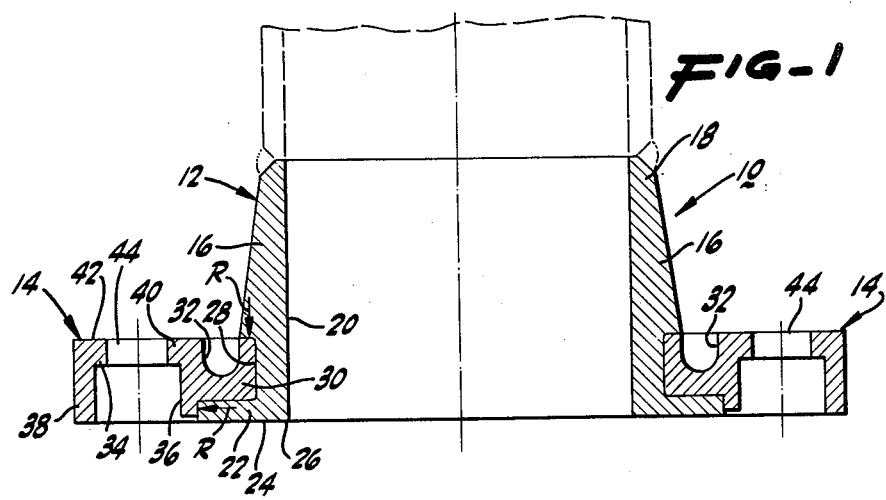
FIG-1
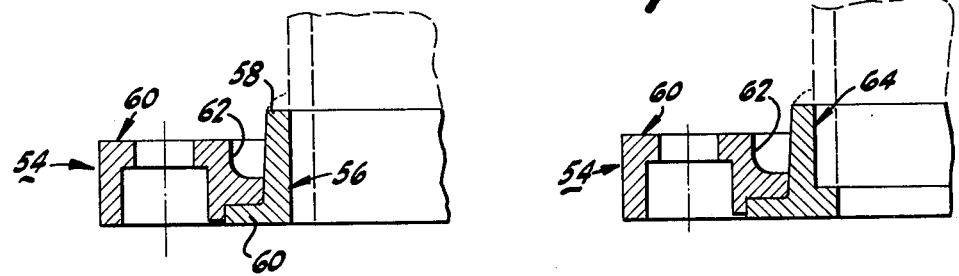
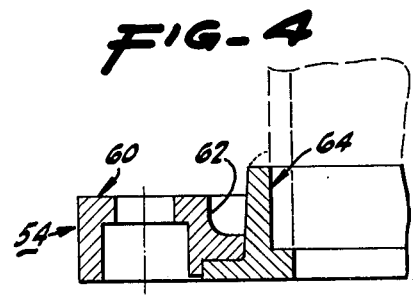
FIG-3    FIG-4
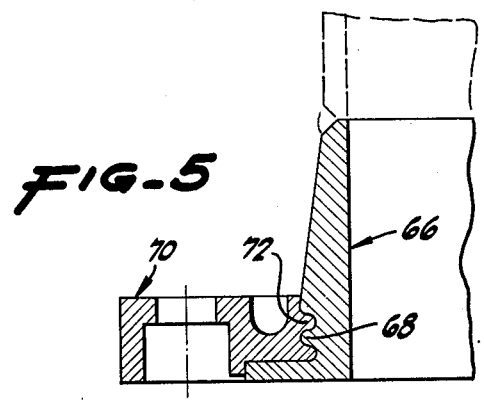
FIG-5

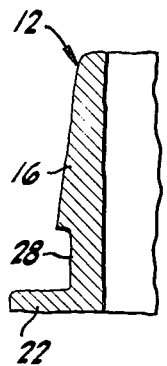
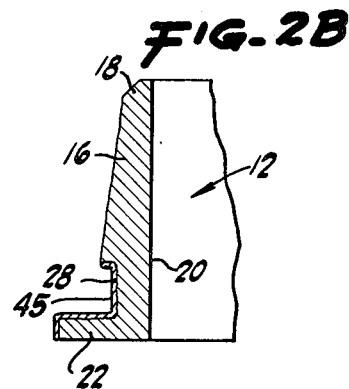
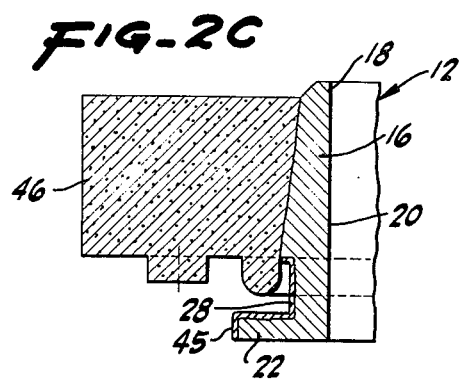
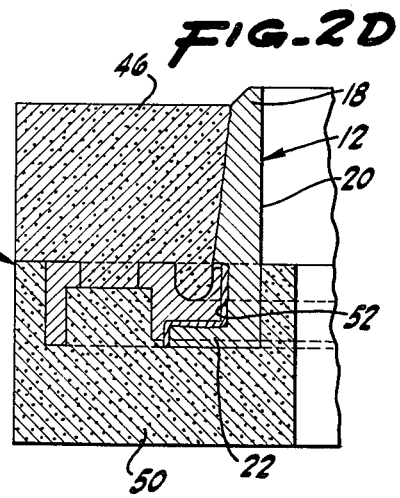
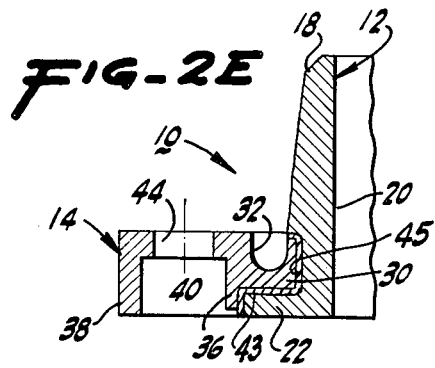

BIMETAL FLANGE CONNECTOR

BACKGROUND OF THE INVENTION

This invention is a continuation in part to my U.S. application of the same title, Ser. No. 06/212,021, filed Dec. 1, 1980 and now abandoned.

This invention relates to the construction of flange connectors for metal pipe or fittings. Because of the in-line detachability of flanged pipe fittings, and other components, the use of flange connectors is an important consideration in designing any piping system. The inherent higher cost of flange connectors compared with other more permanent connectors or connections requires a judicial use of flanged pipe, fittings or system components such as valves and the like. Any reduction in the cost of flange connectors therefore allows a more liberal use of this desirable type of connector in piping systems.

Various proposals have been made for reducing the cost of flange systems without reduction in quality or operational requirements such as strength and system compatibility. New flange designs should desirably operate compatibly with conventional flanges on standard auxiliary components in a piping system such as valves, pumps, filters and other common system units which carry their own integral flange connectors.

In the patent of Schultz, entitled, "Flange", U.S. Pat. No. 3,794,363, issued Feb. 26, 1974, a flange connector having a convoluted or trough configuration is proposed whereby the conventionally thick flange can be replaced by one of substantially thinner construction at a substantial savings in cost. This may be of particular import as noted in Schultz where the flange consists of expensive material, such as stainless steel. The flange proposed by Schultz was cold formed from a blank in a press operation to the annular trough configuration described.

Advanced casting techniques coupled with design configurations emphasizing strength characteristics have allowed metallic flanges of exceptionally low weight and size to be fabricated. Such flanges are described in the copending application of SCHLICHT and NIDER, Ser. No. 065,522, filed Aug. 10, 1979. In such application, the metal flange constructions were designed to substitute for the cumbersome and expensive plastic-type flanges in plastic pipe systems.

In metal pipe systems conventional flanges are generally fabricated from the same type of material as the pipe. Thus, for example, where high strength steel or stainless steel pipe is utilized, heavy flange connectors of like material are employed to enable use of compatible material for strong welded connections to the pipe or fitting bends. Additionally, the fluid carried by the pipe or the fluid pressure in the pipe may dictate the composition of the flange material. In the case of certain materials, such as stainless steel, these requirements can result in a costly conventional type flange device.

The flange connectors of the present invention are the product of a fabrication process that enables the bulk of the flanges to be fabricated from an inexpensive material which is not dictated by welding requirements, fluid characteristics or pressure requirements. The resultant flange connector is therefore inexpensive and, if desired, fabricated in complex configurations enabled by molding techniques not available to many materials utilized in the piping in a given system. As a collateral advantage, the greater part of the flange connector needs no machining at a savings in not only cost, but in the number of operations required to construct a finished flange connector.

SUMMARY OF THE INVENTION

The flange connectors of this invention are the product of a process which casts the major portion of the flange structure from a first metal material onto a central hub or inset of a second metal material. The resultant bimetallic flange has properties which are not available from fabrication of a flange entirely from either of the metal materials. The composition of the first metal material is preferably a common ductile iron which is inexpensive, easily cast at relatively low temperatures, relatively high in strength and nonbrittle. Unortunately, the material cannot be welded without subsequent impractical and expensive heat treatment. Other castable materials may naturally be used where other properties are desirable which differ from the properties of the second material. The composition of the second material may be of greater variety, but typically is weldable to pipe or fittings of generally similar composition. It is high in structural strength, may be forged or cast, and is easily machinable. Usually, the second material is of greater unit cost than the first material.

The inset or hub is first formed and machined where necessary. The machined inset is constructed from a material which is easily connectable to the pipe or fitting, principally by welding. For example, where a flange connector is desired to be connected to the end of a stainless steel pipe, the inset which comprises the hub of the flange connector is formed of a similar stainless steel that can be easily welded to the pipe.

The configuration and composition of the inset is such that the integrity of the piping system is maintained for pressure range and fluid type. The inset is of a generally cylindrical configuration with a wall thickness equivalent to that of the pipe, and it has a flared end facing for seating a gasket on connection to an opposed flange.

The bulk of the flange comprising the flange rim however, is formed of an inexpensive ductile iron which can be cast to a finished configuration, including flange holes, logos, structural webbing and other design features desired. To render the flange connector an integral unit, the flange rim is directly cast onto the outer surface of the prepared inset.

It has been discovered that when a ductile iron or other high carbon material is directly cast onto an inset having a low carbon content there is a migration of the carbon from the rim casting that may adversely affect the properties of the inset. Carbon migration into the material of the inset may affect the inset's corrosive properties, structural properties and/or weldability. To prevent or inhibit such migration, the inset, for certain bimetal material combinations, is further prepared by the application of a boundary layer of material, which prevents or substantially inhibits the carbon migration. While experimentation may produce more suitable boundary layer materials, it has been found that a chromium layer provides such inhibition or prevention of carbon migration. The boundary layer can be applied by mounting a film or foil to the cast, or by coating the inset, by gilding, electroplating, electrostatic vapor depositing or other like means. In certain situations where external corrosion attack is expected, the entire inner surface of the mold can be provided with a desirable protective material resulting in a coated flange rim. For example, a chromium foil or film composition that is suitable to restrict carbon migration will usually, by its inherent nature, have an anti-corrosive characteristic when advantageously applied to the entire outer surface of the cast flange rim. The resulting flange is thereby suitable for service in external as well as internal corrosive environments. The boundary material need not be metallic and may comprise a ceramic, enamel or high temperature synthetic interposed at least at the interface juncture of the rim and inset.

The addition of a boundary layer for inhibiting carbon migration is particularly important in low carbon inset materials such as stainless steel and other low carbon alloys. Where the inset material has a relatively high carbon content, as compared with stainless steel or other alloys, the boundary layer is not necessary and the rim can be directly cast to the inset without such additional preparation. The cast flange rim on cooling adopts a tight shrink fit around the inset. The fit can be enhanced by providing a locking structure on the inset such as a groove or ridge at the interface of the cast rim and preformed inset. In certain castings the fit between the rim and insert adopts a metallurgical bond as well as a shrink fit. Where the metalurigical bond is significant, the groove or ridge may be substantially reduced in size and in certain instances eliminated, where the structural integrity equals design specifications. The metallurgical bond may be enhanced, where certain carbon inhibiting boundary materials have a mutual bonding affinity for both the case rim and inset. Preferably, there is provided a flared end to the inset, which on integration of the inset and rim, forms a restriction to slip displacement of the rim on the hub on connection in addition to providing a facing on the flange hub.

A flange connector fabricated in this manner allows all machining to be accomplished on the inset including inside surface, butting surface and weld chamfer. The advantage of machining the relatively light weight inset is apparent. Not only is the handling facilitated, but the smaller diameter of the inset, as compared with the diameter of annular flange rim, allows a smaller lathe chuck to be utilized and hence when combined with the reduced weight of the part needed to be machined, allows the use of smaller machining equipment.

These and other advantages will become apparent from a consideration of the detailed description of the preferred embodiments.

BRIEF DESCRIPTION OF THE DRAWINGS

FIG. 1 is a cross sectional view of a flange connector fabricated from the flange construction process.

FIGS. 2(A-E) are partial cross sectional views of the flange connector in sequential stages of fabrication.

FIG. 3 is a partial cross sectional view of a modified embodiment of the flange connection of FIG. 1.

FIG. 4 is a partial cross sectional view of a second modified embodiment of the flange connector of FIG. 1.

FIG. 5 is a partial cross sectional view of a third modified embodiment of the flange connector of FIG. 1.

DETAILED DESCRIPTION OF THE PREFERRED EMBODIMENTS

Referring to the cross sectional view of the metal flange device of FIG. 1, a preferred embodiment of a flange connector 10 is shown. It is to be understood that the specific configuration of the flange connector can be altered depending on the type of components or fittings used in a piping system. The flange connector of FIG. 1 is of a type designed for butt welding to the end of a pipe. Representative alternate constructions for slip-on and socket connectors are shown in FIGS. 3 and 4.

The flange connector 10 is fabricated with an inner hub 12 with a cast-on flange rim 14. The two elements form an integral bi-metallic flange unit. The hub provides the connection site for welding the flange connector to a piping system component 15, here a pipe. The flange rim provides the connection ring for mechanically coupling the flange connector to a cooperating flange on a pipe fitting or system component. The flange rim is displaced sufficiently from the weld site so as to not be affected by the localized heat during the welding operation.

The flange hub 12, which for purposes of the fabrication procedure is more accurately designated an inset, is formed from a forging or casting. The forged or cast inset is comprised of a material compatible with the pipe to which it is to be connected in strength characteristics and in composition. The composition must be suitable not only for welding, bracing, soldering or other connection procedure, but for its service with regard to the nature of the fluid being transported since it is expected that a portion of the inset have fluid contact. Generally, the composition will be the same as the pipe or fitting to which the inset is welded. The inset may be steel, stainless steel, monel or any of a variety of metallic materials customerily utilized for piping or fittings.

The inset 12 is preferably configured with a neck portion 16 having a chamfered end 18 which is butted to a simularly chamfered end portion of a pipe or fitting for a conventional single-vee groove weld joint. The diameter of the conduit surface 20 inside the neck portion is equal to the inside diameter of the pipe to which it is attached to provide a continuity of the flow passage for the liquid or gas fluid within the piping system. Opposite the chamfered end 18 is a flared end 22 with a facing 24, which provides a seat for a gasket (not shown) that is sandwiched between the end facing 24 of the inset and a similar facing of an opposed flange device (not shown). Any contact of the fluid is therefore confined to the conduit surface 20 of the inset or any exposed portion 26 of the facing 24. Assuming that an inert gasket is used, any seepage at the end facing will not cause a contamination of the fulid as the material of the facing is the same as the material of the conduit surface.

The inset, as noted, may be of a cast or forged material. Depending on the service requirements, the chambered end 18 and the flared end 20 need have the only surfaces requiring finish machining. In some services, it may be necessary to machine the inside conduit surface 20.

Advantageously, machining can be performed on the inset alone, prior to the addition of the flange rim, where the inset would form the inner hub.

The preferred configuration of the inset 12 includes an outer recess 28 behind the flared end 20 which may be formed in the initial forging or casting or, if necessary, subsequently machined. This recess 28 provides not only an absolute lock seating for the subsequently cast outer rim 14, but provides reactant surfaces (R) resisting tortional forces as well as slip forces generated n bolt down of the flange connector to a similar connector.

The outer flange rim 14 which comprises the seating and locating member for the bolts (not shown) that secure opposed flanges together, is cast directly onto the inner hub or inset. Because the outer rim is cast, it can be configured into a complex shape which maximized strength while at the same time minimizing weight. The outer rim, of course, may be cast in a simplified flat thick plate shape instead of the more complex convoluted shape preferred. The preferred configuration of FIG. 1 includes an inset joining portion 30 which fills the recess 28 of the inset 12. The inset portion includes a hollow 32 which reduces the weight of the rim 14 and optimizes stress distribution and direction. The inset portion 30 supports the convolute portion 32 formed by an inner ring portion 36, a concentric outer ring portion 38 and an interconnecting annular web portion 40. The web portion 40 forms a bolting surface 42 and includes a plurality of spaced holes 44 for bolting to an opposed flange. The two ring portions provide the structural members which minimize deformation of the bolting surface on tightening of the connecting bolts.

This complex flange rim configuration is easily cast from a ductile iron material directly into the inset. The optimized design of the flange rim configuration is easily achieved by the casting process and required no finish machining other than minor deburring. It is wholly exterior of the fluid medium and therefore can be fabricated from the inexpensive, easily cast, ductile iron without regard to the nature of the fluid medium in the piping system. Where a problem of adverse carbon migration from the molten ductile iron or other carbon containing material of the rim to the material of the inset occurs, a layer of carbon inhibiting boundary material is provided at least at the interface of the ductile iron and material of the inset. This additional preparation can be directed at either the inner casting surface of the mold and/or to the surface of the inset, either in their entirely or locally at the interface juncture 43 of rim and inset. In the latter instance, application of the boundary layer to the inset is preferred for ease of application and avoidance of the mold gap at the interface. Application of the boundary layer is described with reference to FIGS. 2A–2E. For example, one preferred combination of materials for a bimetal flange utilizes a stainless steel inset and a ductile iron rim. To prevent carbon migration from the high carbon ductile iron rim from adversely affecting the properties of the stainless steel inset, a boundary layer of chromium is vapor deposited on the inset at the interface juncture of inset and rim.

The steps in the fabrication of the bi-metallic flange connector are shown in FIGS. 2 (A–E). In FIG. 2(A) the inset 12 is rough forged or cast to shape. In certain situations the inset, if necessary, can be wholly machined from rod stock, for example, where a particular material for a special service is available only in such form.

In FIG. 2(B) the rough forged or cast inset is prepared for the cast-on flange rim. The inset is surface machined at least on the chamfered end 18 and at the flared end 20. In a cast inset or where demanded by service requirements, the inside conduit surface 20 may also be machined. The outer surface is cleaned to improve the contact of the outer rim when cast. Where a projected migration of carbon from the molten ductile iron will occur to an extent that the properties of the inset will be adversely affected, for example, where the inset is stainless steel, a boundary material is provided, at least at the interface juncture of the inset and cast rim, by vapor depositing a boundary layer 45 of chromium metal on the outer recess 28 and edge of the flared end 22 of the inset. The boundary layer 45 substantially inhibits migration of carbon from the molten high carbon material of the rim to the low carbon material of the inset. The thickness of the layer is generally a fraction of a millimeter and depends on the boundary material selected, the method of layering, the permeability of the inset to migrating carbon, the carbon content of the rim material, and the degree of design tolerance for migrated carbon as it affects the properties of the inset. Where carbon contents of the materials of the rim and inset are approximately equal, or where carbon migration does not present a problem, the step of providing a boundary layer interposed between rim and inset, can be omitted.

In FIG. 2(C) the inset 12 is seated in a half segment 46 of a casting mold 48.

In FIG. 2(D) the other half segment 50 of the casting mold 48 is shown displaced against the first segment, and, together with the interface surface 52 of the layered inset define a void having the configuration of the convoluted flange plate. The void is filled with the cast molten ductile iron and partially cooled before removal of the casting molds and release of the flange connector. On final cooling the flange rim has a shrink fit connection and often a metallurgical connection to the inset or hub. The rim and inset become virtually one piece.

In FIG. 2(E) the flange connector 10 is deburred and ready for a protective coating or use.

As noted, other flange hub configurations can be formed to utilize the flange fabrication process in various pipe systems. For example, in FIG. 3 a slip-on flange connector 54 is shown with a simplified inset 56. The top end 58 is prepared preferably by machining for a fillet lap weld to the outside surface of the pipe. The flange rim 60 is virtually identical to that shown in the preferred embodiment lacking only the recess to the inset in forming a hollow 62.

The socket inset 64 of FIG. 4 illustrates a further embodiment where socket connectors are required. In the embodiments of FIGS. 3 and 4, the shrink fit of the rim onto the inset without the recess in the inset provides a slightly less effective, but still adequately permanent interconnection. Any displacement of the rim on bolt tightening is prevented by the flared end 65.

If desired, a specially designed interface surface may be employed. In FIG. 5, an inset 66 similar to that of FIG. 1 is shown with a rippled ridge and recess interface surface 68. The outer rim 70 naturally developes a complimentary interface surface 72 providing a rigid interlock of the two components. If desired, ridges and recesses which circumvent the inset may be periodically interrupted to eliminate any possibility of the rim rotating on the inset.

These and other embodiments of the flange connector may be produced from the bimetal flange fabrication process described.

What is claimed is:

1. A bimetal flange connector comprising: a preformed flange inset (12) consisting of a first metal material connectable to a piping system component (15) of compatible material to said first metal material; and, cast-on flange rim (14) consisting of a second castable material directly cast onto said preformed inset (12), wherein said inset (12) has an interface juncture (43) with said rim (14) and at least at said interface juncture (43) is interposed a boundary layer (45) of a third material prior to casting said flange rim (14) onto said inset (12), and wherein said second material has a carbon content higher than the carbon content of said first material, and, said third material has an essential characteristic of inhibiting migration of carbon from said second material to said first material.

2. The bimetal flange connector of claim 1 wherein said second material comprises a ductile iron and said third material comprises chromium.

3. The bimetal flange connector of claim 1 wherein said flange inset (12) has an annular recess portion (28), said flange rim (14) being cast to said inset (12) in said recess portion (28).

4. The bimetal flange connector of claim 1 wherein said inset (12) has a flared end (22) with a flange facing (24) and said flange rim (14) is cast directly behind said flared end (22), said flared end (22) comprising a restriction means.

5. The bimetal flange connector of claim 4 wherein said flange inset (12) has a neck portion (16) opposite said flared end (22) wherein said neck portion has an end displaced from said flange rim (14) a distance for welding to said system component without adverse thermal effect to said rim material.

6. A bimetal flange connector of claim 1 wherein said flange rim (14) has a convoluted configuration for reduction of the weight of the flange connector.

* * * * *